US005192833A

United States Patent [19]

Gibson

[11] Patent Number: 5,192,833

[45] Date of Patent: Mar. 9, 1993

[54] ASSEMBLY FOR TERMINATING A CABLE AND PROCESSES FOR MANUFACTURE AND TERMINATION THEREOF

[75] Inventor: Rowland W. Gibson, Newark, Del.

[73] Assignee: W. L. Gore & Associates, Inc., Newark, Del.

[21] Appl. No.: 731,575

[22] Filed: Jul. 17, 1991

[51] Int. Cl.[5] .......... H02G 15/02

[52] U.S. Cl. .......... 174/74 R; 29/857; 29/868; 174/75 C; 174/76; 174/117 F; 439/492; 439/495; 439/892; 439/936

[58] Field of Search .......... 174/74 R, , 75 D, 75 C, 174/76, 117 F, 117 FF; 29/868, 869, 823, 857; 439/492, 493, 495, 892, 936 X

[56] References Cited

U.S. PATENT DOCUMENTS 4,424,403 1/1984 Bogese .......... 174/117 FX
4,533,188 8/1985 Miniet .......... 439/892 X
4,681,222 7/1987 Longhenry .......... 206/347
5,038,001 8/1991 Koegel et al. .......... 174/117 FX

OTHER PUBLICATIONS

Apgar, M. et al; Connector Aligner Aid; IBM Technical Disclosure Bulletin; vol. 26, No. 1; Jun. 1983, p. 218.
Renz, U.; Contact Insertion Method; IBM Technical Disclosure Bulletin; vol. 22, No. 4; Sep. 1979, pp. 1508–1509.

*Primary Examiner*—Morris H. Nimmo
*Attorney, Agent, or Firm*—Gary A. Samuels

[57] ABSTRACT

A stripped reinforced electric signal cable and processes for its manufacture and termination by use of an easily-removable hardenable reinforcing material and a slotted supporting tray which allows maintenance of conductor alignment and manipulation during termination of the cable with removal of the reinforcing material during the termination process in order to facilitate completion of the termination.

7 Claims, 3 Drawing Sheets

ASSEMBLY FOR TERMINATING A CABLE AND PROCESSES FOR MANUFACTURE AND TERMINATION THEREOF

FIELD OF THE INVENTION

The invention pertains to electric signal cables, in particular to flat multiconductor ribbon cables prepared for termination and to processes for preparing such cables for termination and their termination to electrical connectors.

BACKGROUND OF THE INVENTION

The present trend in electric signal cables and connectors for linking cables to electric and electronic devices and instrumentation is for the cables and connectors to be increasingly smaller and more lightweight so that they require less space which with less weight make the devices and instruments containing them smaller and more portable. As the dimensions and weight decrease, it becomes increasingly difficult to manipulate very small cables, connectors, and devices to effect their termination without damage so as to insure proper functionality and good reliability.

SUMMARY OF THE INVENTION

The present invention provides prepared stripped miniature electric cables suitable for easy termination without damage to give reliable terminations to connectors having very close contact pin spacings. Processes for preparing the cables and terminating them by methods which overcome the present problems associated with terminating very small components also comprise an integral part of the invention.

The invention comprises an assembly for terminating a cable comprising at least one center conductor surrounded by insulating material having the bared conductor surrounded and reinforced against bending, uneven alignment with adjacent conductors, or substantial movement by an easily-removable hardenable reinforcing material. One embodiment of the invention has a portion of insulating material stripped from the center conductors and the bared conductors positioned in a slot in a surface of a small support tray which is placed adjacent the remaining insulating material of the cable in a manner which leaves short lengths of center conductors overlapping the edge of the support tray. Easily-removable hardenable reinforcing material is then applied to the conductors in the slot of the tray where the conductors become surrounded and firmly adhered to the tray. The exposed ends of the conductors are in alignment for easy insertion as a group in a properly sized and configured group of termination receptacles of a connector.

The assembly, which includes a support tray, is terminated by insertion of the ends of the conductors into termination receptacles in the same manner as the first embodiment above. The second embodiment is also equally useful for termination of a flat ribbon cable having a multiplicity of center conductors therein.

The assembly at this juncture has the reinforcing material removed, preferably by a heating process, and the center conductors thereof inserted further into the termination receptacles for completion of the termination, having up to that point been maintained in alignment by the reinforcing material and tray or band of insulating material.

The fully inserted center conductors are now crimped, soldered, or held in place by flexible contacts to complete the termination of the center conductors to the connector. Further steps to complete the cable termination may now be carried out, such as application of further insulation or any cable shielding which may be present in the cable to the connector ground, and closure and/or sealing of such protective shell portions as may be required to the body of the connector.

The assembly of the invention is applicable to shielded and coaxial shielded electric cables as well as simple insulated conductors and flat ribbon cables containing a multiplicity of center conductors and ribbon cables comprising a multiplicity of coaxial cables or ribbon cables wherein the signal conductors are shielded as a unit by conductive shielding.

In the case of shielded cables, in the stripping process, the shielding is folded back over the cable after loosening it from around the center conductors and surrounding insulating material to leave the insulating material and center conductor exposed for subsequent stripping procedures. After the center conductor is terminated to a connector, the shielding is subsequently folded back down over the insulated center conductor and appropriately trimmed and connected to a grounding means or contact provided for the purpose on the connector body or on another component of the complete connector.

The above embodiment of the assembly of the invention is particularly useful for very small ribbon cables containing very small gauge center conductors which are to be connected to very small cable connectors having contacts on very close centers. The assemblies and the processes of the invention provide a means to avoid damage and misalignment inherent in terminating very small and delicate cables and conductors, a means useful in principle of operation and application down to the limits of usefulness of the material components of the cables and connectors.

The processes of preparing the embodiments of the assemblies of the invention and terminating them to a connector also comprise a part of the invention as will be further described and delineated in the description of drawings, and claims to the invention.

DESCRIPTION OF THE INVENTION

The invention is now described with reference to the figures to more clearly delineate and point out the various aspects of the articles and processes of the invention.

Figure 1:
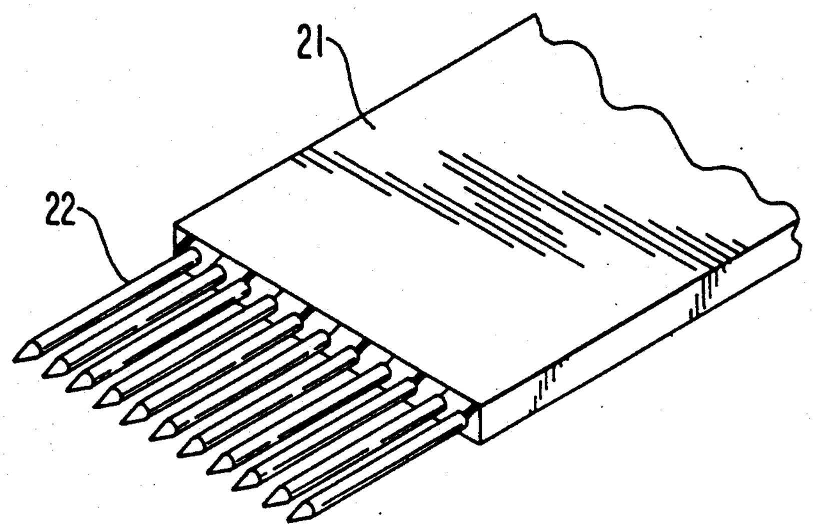
FIG. 1 shows a stripped ribbon cable in a perspective view.

In FIG. 1, a common multiconductor ribbon cable is shown with some insulation 21 stripped off the conductors 22.

Figure 2:
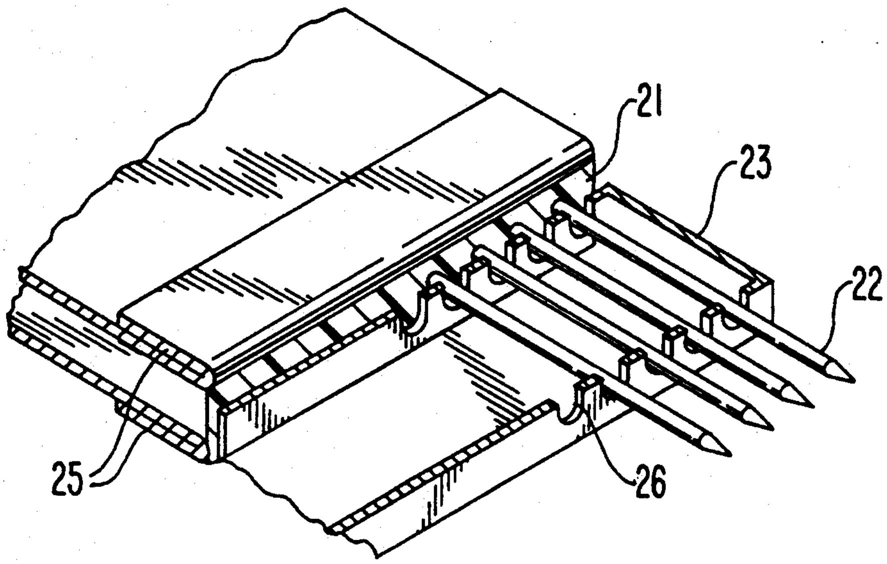
FIG. 2 describes in a perspective view a stripped shielded ribbon cable in which the shielding on both sides of the cable has been folded back over the cable and a slotted supporting tray placed against the cut face of the cable in position to receive easily-removable hardenable reinforcing material.

FIG. 2 describes a more complex ribbon cable which has been similarly stripped to the cable of FIG. 1 as to insulation 21 and conductors 22 with the upper and lower segments of shielding 25 folded back above and below the cable flat surfaces. Slotted reinforcing tray 23 has been set adjacent the cut edge of insulation 21 of the cable with conductors 22 resting in slots 26 of tray 23 which are appropriately sized and shaped to receive conductors 22. Tray 23 is appropriately manufactured from materials which will not stick to the easily-removable hardenable reinforcing material 24 which is selected to be utilized.

Figure 3:
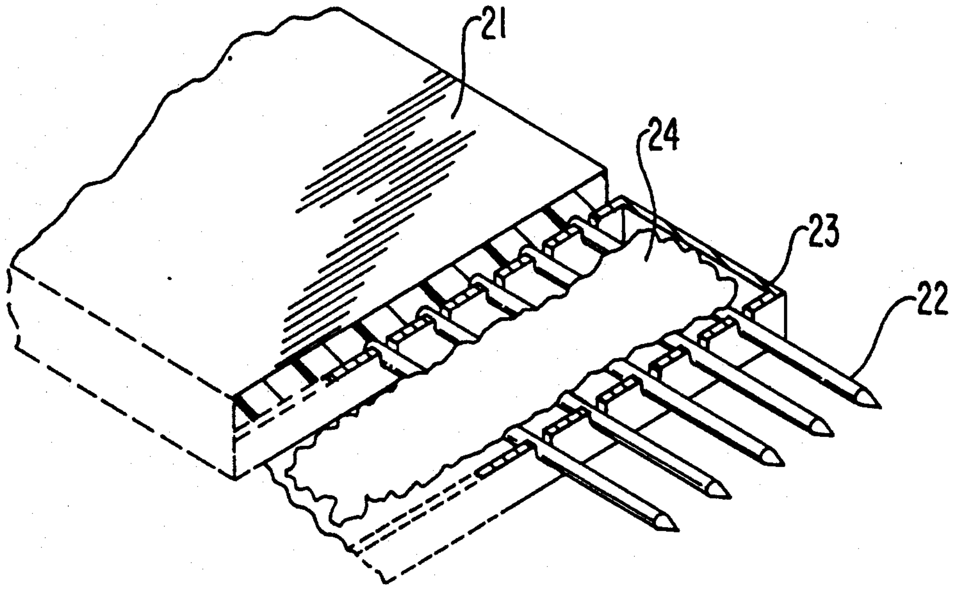
FIG. 3 shows in a perspective view a stripped ribbon cable the conductors of which lie in position in the slots of a supporting tray and the tray containing easily-removable hardened reinforcing material.

FIG. 3 depicts the cable and tray of FIG. 2 in which the space surrounding the conductors 22 in tray 23 has been filled with reinforcing material 24 which has hardened in place.

Figure 4:
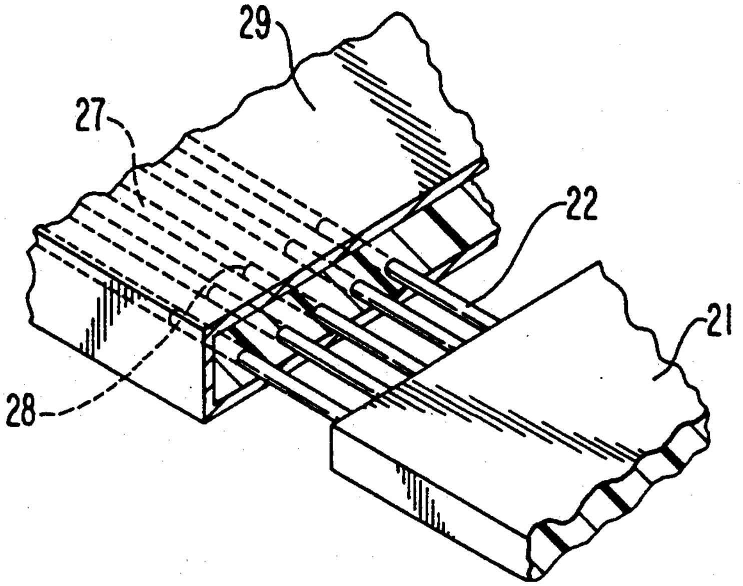
FIG. 4 depicts in a perspective view the ends of the conductors of a flat ribbon cable partially inserted into the receiving receptacles of a connector.
Figure 5:
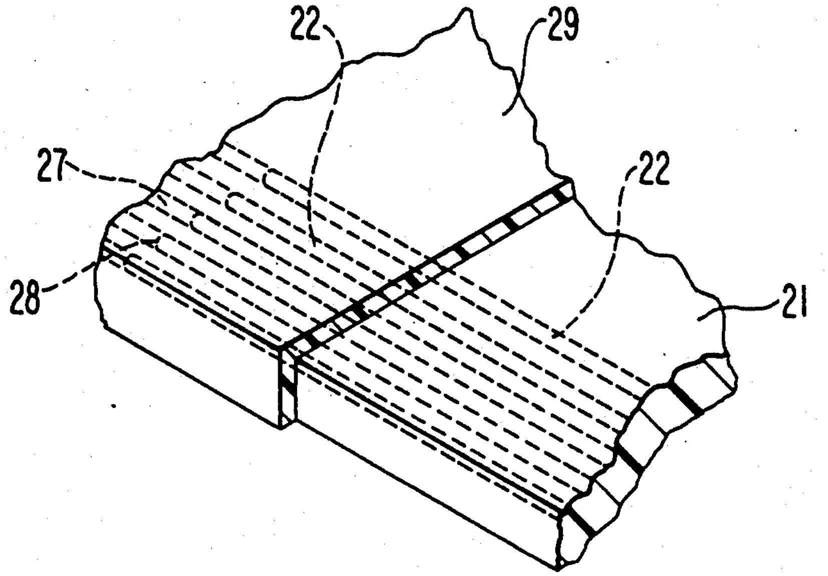
FIG. 5 shows in a perspective view a full closure of a ribbon cable with a connector.

The cable, tray, conductors, and reinforcing material of FIG. 3 as a unit is positioned in front of a face of a connector 29 which has termination receptacles 27 aligned in its face to receive conductors 22, which are inserted into receptacles 27 as far as they will penetrate. Reinforcing material 24 is now removed, preferably by melting, and tray 23 also removed to leave conductor ends 28 partially terminated in receptacles 27 as shown in FIG. 4. The cable is now urged toward connector 29 to fully mate the cable and connector, as shown in FIG. 5, so that completion of the termination may now be effected by addition of insulation, sealing materials, and protective shrouds and the like. The easily-removable hardenable reinforcing material 24 may comprise preferably solid carbon dioxide but may also be fluxed solder, a low-melting metal alloy, or meltable resin which leaves no residue on melting and removal. Slotted reinforcing tray 23 may be metal or plastic as selected to not stick to the reinforcing material 24 being used for a specific application. When carbon dioxide is being used, liquid carbon dioxide may be poured into a support tray 23 where it will harden to a solid as heat is carried away by evaporation of the carbon dioxide or by the support tray. Melted forms of the other materials listed above will also cool and harden in tray 23.

Figure 6:
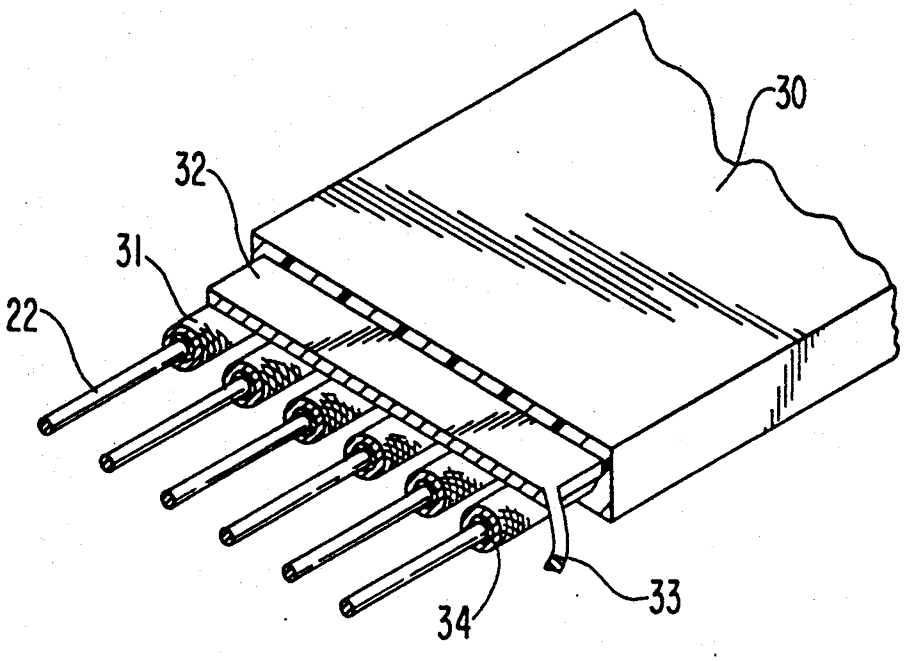
FIG. 6 describes in a perspective view a stripped coaxial ribbon cable having the shielding layers of the coaxial cables contained therein connected by a strip of conductive metal for grounding them to a connector.

FIG. 6 shows a stripped multiconductor coaxial form of ribbon cable in which insulation 30 has been stripped from the coaxial cables and the shielding 31 and primary insulation 34 of each coaxial cable has been further stripped to leave short shielded ends of cable from which extend conductors 22. A thin strip 32 of conductive metal is now attached to shields 31 of the coaxial cables to terminate them to a common ground. Tab 33 of strip 32 is available to effect the grounding to a connector. A slotted tray 23 is similarly placed against the ends of coaxial cable or strip 32 and reinforcing material 24 applied similarly to the method with the ribbon cables described above to hold conductors 22 firmly in place and properly aligned for easy and accurate termination, which is also performed in the same manner as that described above.

The inventive products and processes described above thus provide a means to assemble and terminate very tiny cable and connector parts easily under conditions otherwise tedious, difficult, or costly.

It should be noted that the drawings are presented in a scale greatly in excess of that of the actual dimensions of the most useful size of articles of manufacture of the invention which may be of the order of one-half inch or less in overall size.

I claim:

1. An assembly for terminating a cable comprising:
   (a) at least one center conductor surrounded by insulating material and having a segment of said insulating material stripped from the end of said conductor;
   (b) a supporting tray, including at least one set of alignment slots formed across the width of said tray, said tray positioned adjacent said insulating material to support said at least one center conductor lying in one of the slots in the at least one set of alignment slots, said tray being of a width to leave a portion of said at least one center conductor extending unsupported by said one slot outwardly past the outermost edge of said tray; and
   (c) an easily-removable hardenable reinforcing material surrounding said at least one center conductor in said one slot in said tray.

2. An assembly of claim 1 wherein said reinforcing material is selected from the group consisting of solid carbon dioxide, fluxed solder, low-melting metal alloy, and meltable resin which leave no residue on melting and removal.

3. An assembly of claim 1 wherein said reinforcing material has been removed to leave an end of said at least one conductor exposed for insertion in a connector termination receptacle.

4. A process for preparing an assembly for terminating a cable having at least one center conductor surrounded by insulating material, comprising the steps of:
   (a) stripping a segment of said insulating material from the end of said cable having at least one center conductor surrounded by insulating material;
   (b) positioning a support tray, including at least one set of alignment slots formed across the width of said tray, said tray positioned adjacent said insulating material to support said at least one center conductor lying in one of the slots in the at least one set of alignment slots, said tray being of a width to leave a portion of said at least one center conductor extending unsupported by said one slot outwardly past the outermost edge of said tray; and
   (c) applying and allowing to harden an easily-removable hardenable reinforcing material surrounding said at least one center conductor in said one slot of said tray to affix said at least one center conductor in place in said one slot in said tray.

5. A process for terminating an assembly for terminating a cable having at least one center conductor surrounded by insulating material, a slotted reinforcing tray adjacent to said insulating material surrounding said at least one center conductor, said at least one center conductor in said slot of said tray being surrounded by easily-removable hardenable reinforcing material, and said at least one center conductor extending past the outermost edge of said tray, comprising the steps of:
   (a) inserting said at least one center conductor in a receiving receptacle of an electrical connector;

(b) removing said easily-removable hardenable reinforcing material in said tray from said at least one center conductor;

(c) removing said tray from said at least one center conductor; and (d) fully inserting said at least one center conductor into said receiving receptacle of said connector.

6. A process for preparing an assembly for terminating a cable having at least one center conductor surrounded by insulating material and by shielding on one or both sides of the insulating material comprising the steps of:

(a) severing and rolling back above and below said insulating material said shielding;

(b) stripping a segment of insulating material lying over said at least one center conductor and under said shielding;

(c) positioning a supporting tray, including at least one set of alignment slots formed across the width of said tray, said tray being positioned adjacent said insulating material to support said at least one center conductor lying in one set of said alignment slots, said tray being of a width to leave a portion of said at least one center conductor extending unsupported by said tray outwardly past the outermost edge of said tray; and (d) applying and allowing to harden an easily-removable hardenable reinforcing material surrounding said at least one center conductor in one set of said slots of said tray to affix said at least one conductor in place in one set of said slots of said tray.

7. A process for preparing an assembly for terminating a cable having more than one coaxial cable, each coaxial cable including a center conductor, a first insulating material surrounding said center conductor, and shielding surrounding said first insulating material; said assembly surrounded by a second insulating material, comprising the steps of:

(a) severing and stripping a segment of said second insulating material surrounding said coaxial cables;

(b) affixing a strip of conducting material across said shielding of said coaxial cables to provide a grounding means for said shielding;

(c) severing said shielding and underlying said first insulation from said center conductors of said coaxial cables which extend past said strip of conducting material to the end of said center conductor of said cables;

(d) positioning a supporting tray, including at least one set of alignment slots formed across the width of said tray adjacent said strip of conducting material to support said center conductors lying in said slots, said tray being of a width to leave a portion of said center conductors extending unsupported by said tray outwardly past the outermost edge of said tray; and (e) applying and allowing to harden an easily-removable hardenable reinforcing material surrounding said center connectors in said slots in said tray to affix said conductors in place in said slots in said tray.

* * * * *